United States Patent
Aldworth et al.

(10) Patent No.: US 11,830,096 B2
(45) Date of Patent: Nov. 28, 2023

(54) SYSTEM AND METHOD FOR ACHIEVING CANDIDATE DIVERSITY IN A CANDIDATE APPLICATION SYSTEM

(71) Applicant: OCAS, Guelph (CA)

(72) Inventors: Michael Aldworth, Guelph (CA);
Jeffrey Glassford, Kitchener (CA);
Wayne Edward Jason Hesch, Waterloo (CA); Darren Mackenzie O'Shea, Kitchener (CA); Marc Andrew Provencher, Guelph (CA); Shawn Maurice Robinson, Cambridge (CA); Alisha Sanghera, Burlington (CA); Kevin Michael Schneider, Wyoming (CA); Tudor Alexander Whiteley, Puslinch (CA); Michael Arman Williamson, Guelph (CA)

(73) Assignee: OCAS

( * ) Notice: Subject to any disclaimer, the term of this patent is extended or adjusted under 35 U.S.C. 154(b) by 873 days.

(21) Appl. No.: 16/286,676

(22) Filed: Feb. 27, 2019

(65) Prior Publication Data
US 2020/0273126 A1     Aug. 27, 2020

(51) Int. Cl.
*G06Q 50/20*     (2012.01)
*G06Q 10/0631*   (2023.01)

(52) U.S. Cl.
CPC ... *G06Q 50/2053* (2013.01); *G06Q 10/06312* (2013.01); *G06Q 10/06315* (2013.01)

(58) Field of Classification Search
CPC ......... G06Q 50/2053; G06Q 10/06312; G06Q 10/06315
USPC ......................................................... 705/327
See application file for complete search history.

(56) References Cited

U.S. PATENT DOCUMENTS

| | | | |
|---|---|---|---|
| 2005/0080756 A1* | 4/2005 | Hitchcock | G06F 40/174 |
| 2006/0265258 A1* | 11/2006 | Powell | G06Q 10/10 |
| | | | 705/327 |
| 2018/0189911 A1 | 7/2018 | Al-Sulaiman et al. | |
| 2019/0102854 A1* | 4/2019 | Terra | G06F 16/9535 |

OTHER PUBLICATIONS

The Inter-university Consortium for Political and Social Research (ICPSR), "Diversity Scholarship", Nov. 11, 2018, https://www.icpsr.umich.edu/web/pages/sumprog/scholarships/diversity.html (Year: 2018).*
University of Arkansas, "College of Health Professions Catalog 2017-2018" Sep. 2017, retrieved from https://healthprofessions.uams.edu/wp-content/uploads/sites/9/2017/09/College-of-Health-Professions-Catalog-2017-2018-FINAL.pdf ( Year: 2017).*

* cited by examiner

*Primary Examiner* — Sangeeta Bahl
*Assistant Examiner* — Joshua D Schneider

(57) ABSTRACT

A system and/or method can be provided for improving applicant diversity by giving institutions selectable and adjustable application windows, thereby providing a number of benefits including an enriched learning environment. A similar system or method may be used to manage the availability of application windows in general to ensure that a diversity of applicant groups have an opportunity to apply.

14 Claims, 4 Drawing Sheets

SYSTEM AND METHOD FOR ACHIEVING CANDIDATE DIVERSITY IN A CANDIDATE APPLICATION SYSTEM

BACKGROUND

The embodiments described herein relates to candidate application systems and more particularly, to a system and method for student application for post-secondary education institutions.

Post-secondary institutions, such as colleges, universities or vocational schools, may have a variety of reasons for wanting a diversity of international students in their classrooms. Diversity of applicant origin reduces the risk of any specific country restricting applications to the institution, or restricting attendance/emigration—these may result in last-minute acceptance cancellations, meaning unfilled classes and lost revenue. Diversity of applicant origin creates an enriched learning experience for all students, bringing together a variety of learning and communication styles and values. For these reasons, encouraging a diversity of students is often also an explicit goal.

Measures of diversity vary, and may need to be made explicit. In some cases, diversity of the enrolling class is desired; in other cases, diversity of attendees throughout the several years of a program, or throughout an entire institution, may be desired. The diversity factor may be area of origin, applicant ethnicity, applicant native language, applicant income level, or any other data about the applicant. The measure of this diversity may be the percentage of applicants not from a single dominant region.

A post-secondary institution which accepts applications from international applicants, through agencies, may see a flood of applications from specific geographic areas, immediately upon registration opening for a given program. This may happen for a number of reasons: some areas are well served by agencies, whereas others may be lacking in agencies (perhaps for political, social or regulatory reasons); some areas may have a social/demographic bias towards applying to educational opportunities in specific programs, institutions or countries; some areas may have a much larger population than others; or any other reason. Additionally, some areas may produce a moderate number of applications but with a very high percentage of high-quality (i.e., admissible) candidates, while other areas may struggle to produce as many admissible candidates.

The effect of such a flood of applications from a single area (whether an overall large number of candidates, or a very high fraction of admissible candidates) is to crowd out applications from other regions. This may work against the institution's diversity goals.

Traditional methods of encouraging diversity have drawbacks: quotas may leave seats unfilled in a program if there are insufficient applicants from the group targeted by a quota; differentiated application requirements, per group, risk creating a fractured class environment; and targeted promotion of a program may not sufficiently address the problem.

SUMMARY

Systems and methods for improving certain measures of applicant diversity by giving institutions selectable and adjustable application windows, thereby providing a number of benefits including an enriched learning environment. A similar system or method may be used to manage the availability of application windows in general to ensure that a diversity of applicant groups have an opportunity to apply.

Various methods of selecting and adjusting the acceptance windows per region or per type of applicant are shown. The algorithms used to manage the opening and closing of acceptance windows can be static per academic acceptance cycle, or can be dynamic and responsive to various factors or predictive algorithms.

Thus, the systems and/or methods described herein can reduce the application rate of certain groups through throttling, thus favoring applications from other groups. Other features and advantages of the systems and/or methods are described more fully below.

DETAILED DESCRIPTION

Figure 1:
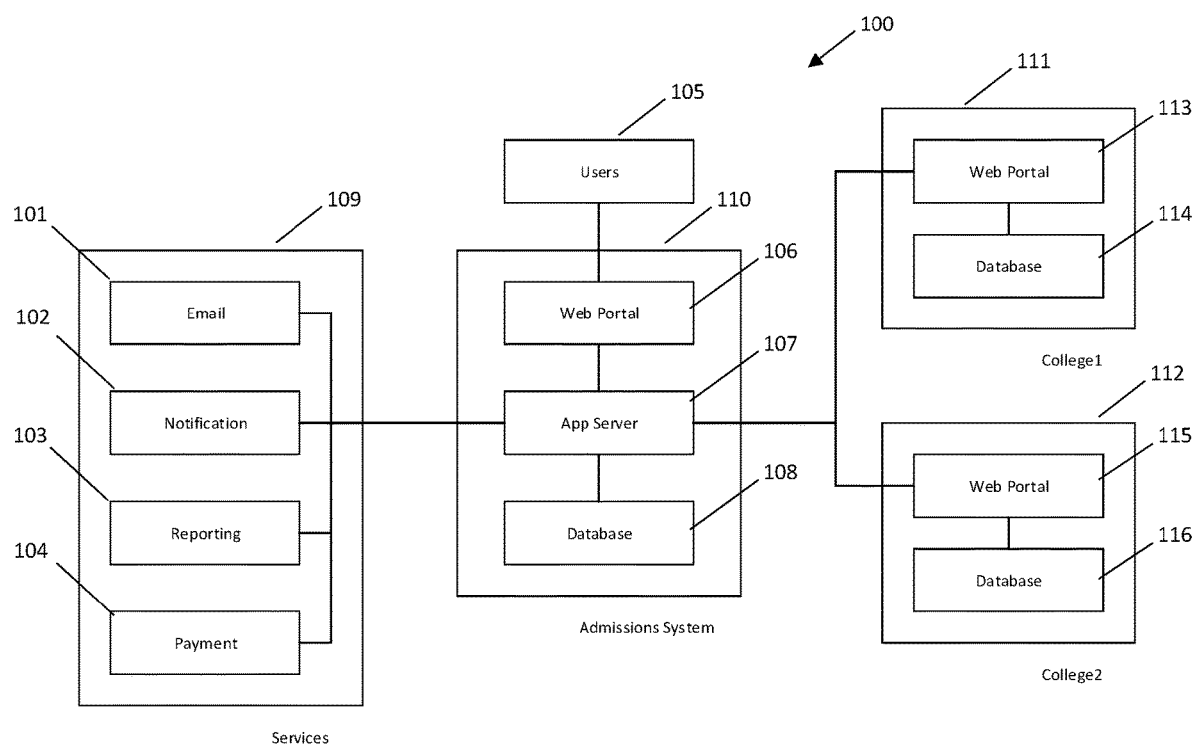
FIG. 1 is a system diagram illustrating an exemplary candidate application system.

The present application implements a system which maximizes applicant diversity through the use of a sliding application opening window for applying for acceptance/entrance for a post secondary institution. Programs are opened to application (made available to be applied to) at different times in different agencies (this is known as the start time of the application window, when the rule becomes active. The stop time corresponds to the time from which point forward applications are no longer accepted, and the rule ceases to be active). In one embodiment, agencies and areas which are known to produce many admissible candidates are opened later or at different times, to give slower-applying or lower-populations areas more time to submit candidates. The phrase "educational institution" may include a vocational college, a public or private college, a public or private university or a trade school. The phrase "post-secondary" refers to further education above and beyond secondary school and or high school. It may be understood that the present application may be applied to any institution's application system, including non-post-secondary educational institution application systems.

One implementation of this system opens the application window for a high-application area's agencies half-way through the general program application window. For example, if the normal application window (i.e., the application window without a throttling mechanism) is six months long, this implementation opens the window three months into that normal application window (that is, three months before the window closes for everyone), giving a shorter duration window to the high-application area.

An implementation may allow the closure of applications from a particular region, and may allow later re-opening of applications from this region, if the program is not fully enrolled by a given time.

A more complex implementation creates multiple application windows, all closing on a final application deadline, but each opening at a different time. Different areas are each assigned to an application window, depending on how many admissible candidates each area produces.

Another implementation tracks applicant success (through enrollment rates, graduation rates, employment rates, or some other measure) per area of origin, and, for a subsequent intake year, produces a measure which correlates to how early the application window should open for that area of origin.

An implementation may close enrollment from a particular area if a certain threshold is reached. Closing a specific area of origin's application window early may be beneficial if too many candidates from that area have been admitted (since admission rates vary year to year). An implementation may allow a window to be closed, and then re-opened, as necessary, to ensure maximum enrollment while also maximizing diversity. These windows can be responsive to a variety of admission factors including the overall number of applicants, the number of enrollment openings or spaces remaining for a given program, the rate with which applicants are applying (applications per unit of time), the academic qualities of the applicants, changes to the academic program that is applied for, and other such factors. In addition, the algorithms may include predictive elements, such as AI (Artificial Intelligence) algorithms that are responsive to the rate of change of any of the admission factors noted above. An implementation may also allow a waiver for a particular student from a region with a closed enrollment region, which waiver allows only that student to apply to the program, regardless of whether enrollment for that region is presently open or closed—this mechanism allows exceptional students to apply at all times. Exceptional students could be selected based on grade point average, awards, extracurricular activities, or similar factors. This waiver allows the system to selectively exempt a student from the throttling mechanism.

The calculation of how early a given enrollment window is open may incorporate factors such as the historical or estimated visa-processing time for applicants from that area, the conversion rate or other student success data. Slower-filling regions may open earlier with enough extra time to give those regions a maximal chance of sending viable applicants. The fastest-filling regions may open later, with a long enough window to ensure that the program fills with viable applicants.

The concept of throttling applications from regions may extend to agencies as well. Some agencies may have a history of sending many applicants, crowding out applicants from other agencies. In order to maintain a vibrant balance of agencies, this same throttling mechanism may be used to create a diversity of agency applications.

An implementation may algorithmically calculate a separate enrollment window for each agency in each region, based on measures such as conversion rate, success rate, agency quality, applicant quality, or other measures. Each of these may be historical measures, estimated current measures, or a combination of both. Each window may be opened or closed at any point, to handle real-time application factors (too many/few applicants at an agency, higher/lower applicant quality than expected, or other factors), either algorithmically or through manual adjustment of algorithm parameters. The opening and closing of the application window may be based on specified dates, specified application queue lengths, An implementation may automatically cause an enrollment window to show as open or closed, or it may indicate in a user interface or report that a window should be opened or marked as closed, or a combination of these.

Another aspect of this application is the ability to throttle based on any criteria. For example, it may be desirable to limit the number of applicants who don't meet a particular language fluency level. This may be accomplished by creating application windows based on language fluency level, and only opening the lower fluency level window after the higher one has been open for some time. Any application criteria may be used to throttle: some examples would be grades in specific courses, experience in specific matters, or completion of courses which may not be prerequisites but which may help with academic success in a particular program.

An implementation may allow for multiple throttling criteria, with each criterion needing multiple application windows. An implementation may allow for this by implementing multiple application windows for each criterion, with every application being assessed against the multiple criteria and only being accepted if the application passes each criterion's window. For example, if three criteria are agent quality, location and English proficiency, the application system may open admissions for high agent quality applications on January 1st, but only open on May 1st for lower agent quality applications; they may open admissions on January 1st for low demand areas but on March 1 for medium-demand areas and May 15th for high-demand areas; they may open admissions on January 1st for high English proficiency applicants, February 1st for medium-level English proficiency and April 1st for lower-level English proficiency. In this example, an application from a high-quality agent (window opening January 1st) with medium-level English proficiency (window opening February 1st) in a medium-demand area (window opening March 1st), would not be eligible for application until the latest of the criterion windows is open (in this case, March 1st). In accordance with the waiver aspect of the implementation noted above, this example application may (if the implementation allows for waivers) proceed earlier than March 1st if the application is given a waiver for one or more of the throttled criteria.

An agency-based college application system comprises an agent portal and a college portal, implemented on a server system. Some implementations may comprise a central database to store applications, may comprise an administration portal for direct access to applications, and may comprise a central server to administer the application window.

The agent portal is a user interface which is enabled to receive applications and information about applications and applicants, from an agent. The agent submits applications on behalf of the applicant via the agent portal.

The administration portal is enabled to allow the configuration of when a particular application window opens, when it closes, which criterion it is throttling, and to which program/institution it applies. The portal is enabled to modify appropriate configuration values on the central server. The throttling criterion may be any relationship or comparison of a part of an application to a particular value; such as, but not limited to, the geographic region of the applicant being a particular value, the English proficiency of the applicant being greater than a certain value, the agency being present on a list of agencies, or a metric of agency quality for the submitting agency being greater than a certain value. The throttling criterion, therefore, specifies an aspect of the application, specifies a given value, and specifies a relationship between that aspect and that given value. The comparison between the value and the related aspect on the application can be a mathematical or logical comparison, for example testing if an agency quality is greater than a particular threshold value of 5.

When an agent attempts to submit an application, the agent portal checks the appropriate and corresponding configuration values on the server, to confirm whether the window is open or closed for the application. Alternatively, the portal may submit sufficient information to the central server for the central server to make a determination as to whether the application window is open or closed for the specific application, and the central server then either enables the agent portal to continue with the application or sends a notification indicating that the application window is closed for that particular application.

The administration portal may enable multiple application windows to be created. In this case, for each application request from an agency, each window is checked and confirmed to be open in order for an application to proceed. The portal may also be enabled to display, update and enable to continue with the application or sends a notification indicating that the application window is open for that particular application.

The administration portal or another portal may be enabled to allow a particular application to proceed regardless of whether all of the application windows permit it to proceed. One mechanism to enable this may be a waiver which is electronically associated with the application, and which causes all checks for application windows to show that the application is permitted to proceed. Another mechanism to enable this may be a one-time override which is enabled from the administration or other portal, which permits an application to pass through one or more application window checks.

A system for determining application or applicant success, whether running on the central server or on another system, may be used to suggest or create an application window. The administration or other portal may be enabled to show suggested application windows which are determined as a result of the applicant/application success system.

FIG. 1 shows a system diagram of the system herein described. The system 100 comprises four main functional components: Users 105, Services 109, Admissions System 110, and Colleges represented as College1 111 and College2 112. The Users 105 communicate to the Admissions System 110 through the Web Portal. The web portal manages the tasks required to prompt the user for information, and to receive this information. The portal may be implemented in one of several well known technologies, such as a web based application, a PC or mobile device application, a terminal application, or other data entry system.

The information collected in the Web Portal 106 is stored on the App Server 107, which is an application server module. The App Server 107 is also connected to the Database 108 that stores the information input by the Users 105 in a non-volatile manner. Depending on several factors, including the information input by the User 105, time, and information from other sources in the system such as the Colleges 111 and 112, the App Server 107 may calculate that additional actions are required, such as one of the Services 109. The Services 109 are represented as functional blocks that can initiate various actions.

The App Server 107 communicates with the Email 101 module, initiating an email. The App Server 107 also communicates with a Notification 102 module, initiating a notification to other users of the system. These notifications may include notifications such as system status changes, or the opening and closing of application windows, or notifications of upcoming events.

The App Server 107 communicates with the Reporting 103 module when a reporting event is required. This may include generating a report containing data or statistics related to the operation of the system, data or statistics related to the applications received, data or statistics related to payments, data or statistics related to any of the data stored in the database, or other data or statistics. The App Server 107 communicates with the Payment 104 module when payment events are required. This may include pre-payment of application fees, government fees, admission fees, fees held in escrow for assurance of future actions, or other types of fees. The Payment module reports the status of payment activity to the App Server 107 for further processing. The Colleges access the system in a manner similar to the Users 105, but have access to different and additional data. For example, College1 111, the post-secondary institution application system for College 1, has a Web Portal interface 113.

This interface is also connected to a Database 114 that stores local copies of the information from the system in addition to being able to store information from additional sources within the college. This permits the college to combine information from the Admissions System 110 with local college information to create insights that can be used to competitive advantage. Similarly, College2 112, the post-secondary institution application system for College 2, has a Web Portal interface 115.

This College2 interface is also connected to a Database 116 that stores local copies of the information from the system in addition to being able to store information from additional sources within the college. This permits the college to combine information from the Admissions System 110 with local college information to create insights that can be used to competitive advantage. The information that can be used to create competitive intelligence include number of applicants, location of applicants, academic record of applicants, extra-curricular activities of applicants, spoken language of applicants, and other information. This information can be combined with conversion rate, success rate, agency quality, applicant quality, the success of previous applicants with similar profiles, or other measures.

Figure 2:
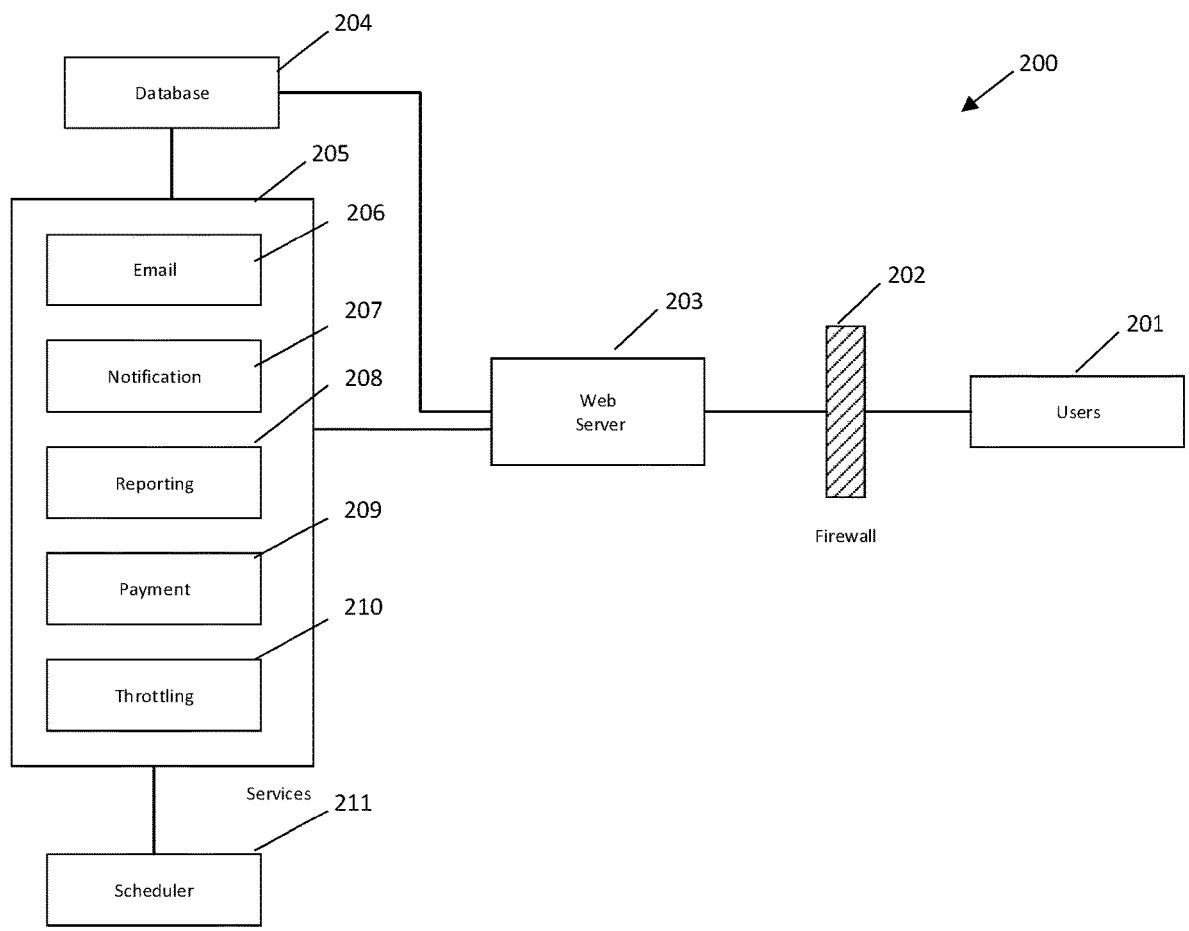
FIG. 2 is an interconnection diagram further illustrating an exemplary candidate application system.

FIG. 2 illustrates a connection diagram for the hardware and software module components of the implementation. The system 200 is comprised of various modules that enable a user to interact with the system. A User 201 communicates through firewall 202 to the Web Server 203. The Firewall 202 provides protection against unauthorized access and malicious attacks to the system.

The Web Server 203 hosts the user interface that manages the tasks required to prompt the user for information, and to receive this information. The Web Server 203 is connected to the Database 204, and stores the information input by the Users 201 in a non-volatile manner. The Web Server 203, the Database 204, and the Scheduler 211 work in conjunction to initiate activities in the Services module 205.

The Services 109 are represented as functional blocks that can initiate various actions. The Web Server 203, the Database 204, and the Scheduler 211 communicate with the Email 206 module, initiating an email. The Web Server 203, the Database 204, and the Scheduler 211 module also communicate with a Notification 207 module, initiating a notification to other users of the system. These notifications may include notifications such as system status changes, or the opening and closing of application windows, or notifications of upcoming events.

The Web Server 203, the Database 204, and the Scheduler 211 communicate with the Reporting 208 module when reporting events are required. This may include generating a report containing data or statistics related to the operation of the system, data or statistics related to the applications received, data or statistics related to payments, data or statistics related to any of the data stored in the database, or other data or statistics. The Web Server 203, the Database 204, and the Scheduler 211 communicate with the Payment 209 module when payment events are required. This may include prepayment of application fees, government fees, admission fees, fees held in escrow for assurance of future actions, or other types of fees. The Payment module 209 stores the record of payment activity in the Database 204. Web Server 203, the Database 204, and the Scheduler 211 are connected to the Throttling module 210. The Throttling module 210 may, for example, algorithmically calculate a separate enrollment window for each agency in each region, based on measures such as conversion rate, success rate, agency quality, applicant quality, or other measures. The Throttling module 210 therefore implements a throttling engine. These windows may be recorded in the Database 204, and used to modify the available options on the Web Server 203.

Figure 3A:
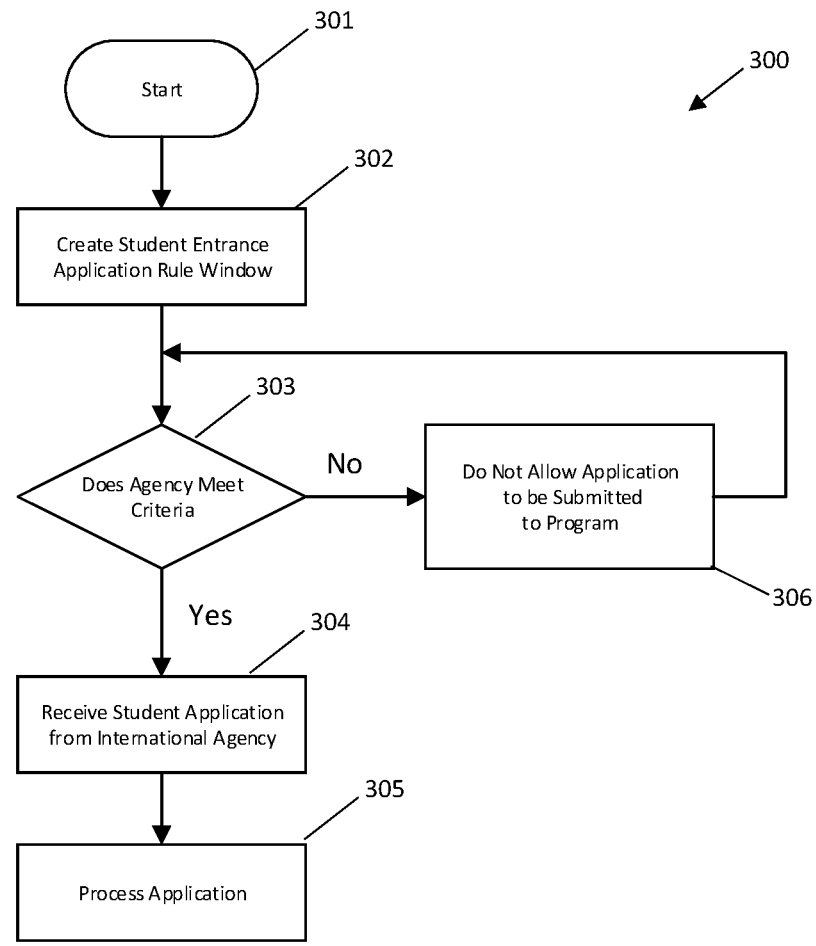
FIG. 3A is a flow chart illustrating a method of throttling in a candidate application system.
Figure 3B:
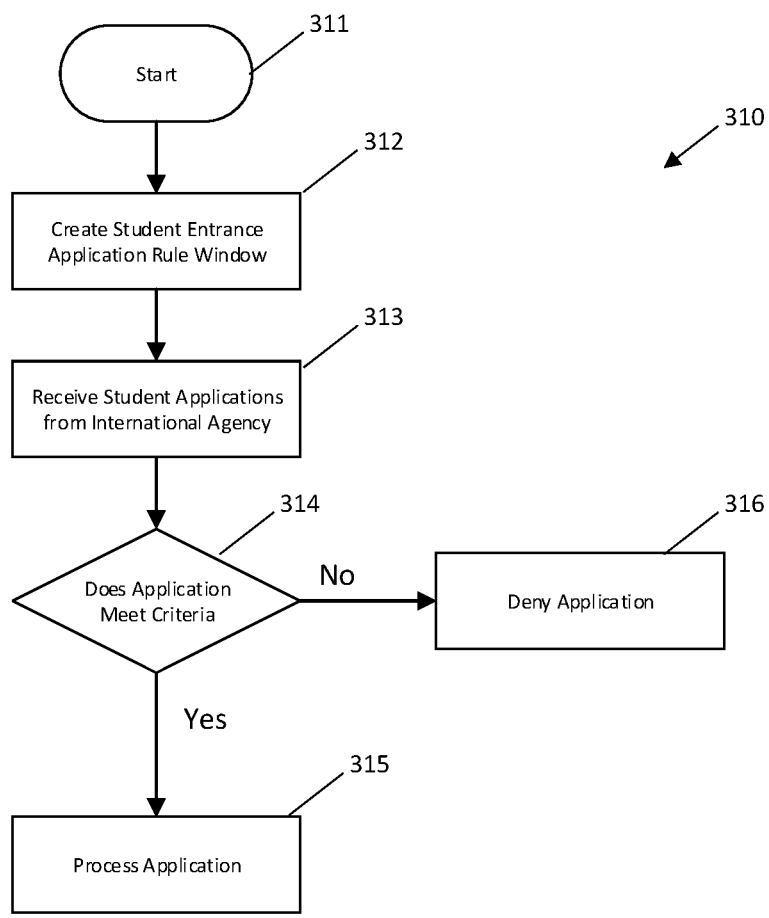
FIG. 3B is a further flow chart illustrating a method of throttling a candidate application system.

FIGS. 3A and 3B are flowcharts of two aspects of the system. FIG. 3A shows the flow of logic in a process 300 wherein the rule pertains to a factor related to the agency, such as, but not limited to, agency identity or agency location. Starting at 301, a Student Entrance Application rule window is created 302. If an agency meets the criteria of the rule 303, the agency application process may proceed as usual, with the system receiving an application 304 and submitting it to be processed 305. However, if the agency does not meet the criteria of the rule at 303, the system marks the program relating to the rule as closed for applications 306, and the agency cannot initiate the process of submitting an application to the program, until such time as the agency meets the criteria of the rule at 303.

FIG. 3B shows the flow of logic in a process 310 wherein the rule pertains to a factor related to the application or applicant or another factor which may not be apparent until an application is received, such as, but not limited to, applicant's place of origin, language proficiency or work experience. Starting at 311, a Student Entrance Application rule window is created 312. An application is received from the agency 313. If the application meets the criteria of the rule 314, it is submitted for processing 315. However, if the application does not meet the criteria of the rule 314, a rejection is sent to the agency and the application is not processed further 316. By way of example, processing may include referring an application to a post-secondary institution, storing the application in a database, flagging the application for further action, or taking some other action relating to the application.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made.

Although various embodiments have been described as having particular features, concepts, and/or combinations of components, other embodiments are possible having any combination or sub-combination of any features, concepts, and/or components from any of the embodiments described herein. The specific configurations of the various components can also be varied. For example, the specific size, specific shape, and/or specific configuration of the various components and/or various inputs or outputs can be different from the embodiments shown, while still providing the functions as described herein. The size, shape, and/or configuration of the various components can be specifically selected for a desired or intended usage.

Where methods and/or events described above indicate certain events and/or procedures occurring in certain order, the ordering of certain events and/or procedures may be modified and that such modifications are in accordance with accepted and/or desired variations of the specific embodiments. Additionally, certain events and/or procedures may be performed concurrently in a parallel process when possible, as well as performed sequentially as described above. Certain steps may be partially completed or may be omitted before proceeding to subsequent steps.

What is claimed:

1. A computer-implemented method of managing diversity of international student admission by limiting at least one admission application from at least one agent of at least one admission applicant, the method comprising:

providing an application management system, the application management system comprising a processor operable via a set of instructions storable in relation to a non-transient memory device, the application management system in communication with two or more educational institutions, wherein the processor running throttling service engine;

receiving, by the throttling service engine of the application management system and from at least one educational institution, at least one throttling criterion comprising at least one of: a geographic area, an applicant age, an applicant nationality, an applicant ethnicity, an applicant gender, an applicant religion, an applicant language proficiency, an applicant work experience, at least one applicant grade, an agency identity, an agency quality metric, and a mathematical value comparison, and a logical value comparison;

creating, by the application management system and based on the at least one throttling criterion, a specified earliest start time for activating the rule window, and a specified latest stop time as the stop time for deactivating the rule window, a Student Entrance Application rule window using a rule window algorithm for at least one educational institution, wherein the rule window algorithm determines a start time and a stop time for receiving an application, the rule window algorithm dynamically adjusting at least one of the start time and the stop time as a function of:

at least one admission factor, and a predictive element based on a rate of change of the at least one admission factor, the at least one admission factor comprising at least one of: an overall number of admission applicants, a number of spaces remaining in an educational program, a rate at which the at least one admission applicant is applying, an academic quality of the at least one admission applicant, and a change to the educational program, wherein the earliest start time for activating the rule window further comprises incorporating visa-processing time for the student from the geographic area of the agent;

receiving, from the at least one agent and by the system, the at least one admission application during the rule window, wherein when the at least one criterion is met, the at least one admission application is processed, and when the at least one criterion is not met, the at least one admission application is rejected, sending, by the application management system, an acceptance notice or rejection notice of the at least one admission application; and communicating, by the application management system, with a payment module to execute prepayment of fees.

2. The method of claim 1, wherein the educational institution comprises a post-secondary educational institution.

3. The method of claim 1, wherein processing the at least one admission application further comprises:

sending the at least one admission application to the educational institution;

evaluating whether an enrollment opening is available in relation to the at least one admission application;

determining whether the at least one admission application is one of accepted and rejected; and if the at least one admission application is accepted, sending at least one corresponding admission notice to the at least one corresponding admission applicant; and if the at least one admission application is rejected, sending at least one corresponding rejection notice to the at least one corresponding admission applicant.

4. The method of claim 1, further comprising selectively exempting the at least one admission applicant from the at least one criterion.

5. The method of claim 1, wherein the at least one throttling criterion comprises at least one of: a geographic area, an applicant age, an applicant nationality, an applicant ethnicity, an applicant gender, an applicant religion, an applicant language proficiency, an applicant work experience, at least one applicant grade, an agency identity, an agency quality metric, and a mathematical value comparison, and a logical value comparison.

6. The method of claim 1, further comprising preventing the at least one agent from submitting the at least one admission application if the rule window is not active.

7. The method of claim 1, wherein creating the rule window comprises creating a plurality of rule windows, and wherein processing the at least one admission application comprises processing the at least one admission application only if the at least one criterion is met and if the rule window is active.

8. The system of claim 1, wherein the prepayment of fees of the payment module is selected from a list consisting of application fees, government fees, admission fees and fees held in escrow for assurance of future actions.

9. The system of claim 1 wherein the admission factors is selected from a list consisting of overall number of applicants, the number of enrollment openings or spaces remaining for a given program, the rate with which applicants are applying (applications per unit of time), the academic qualities of the applicants and changes to the academic program that is applied for.

10. A system for managing diversity of international student admission by limiting at least one admission application from at least one agent of at least one admission applicant, the system comprising:

a processor configurable, via a set of instructions storable in relation to a non-transient memory device, to:

operate with a user interface for receiving at least one admission application;

operate with an admissions system for receiving data relating to the at least one admission application from the user interface, the admissions system in communication with a post-secondary institution application system, and the admissions system running a throttling engine service, the throttling engine service in communication with the processor to two or more educational institutions configuring the processor to:

receive, by the throttling service engine of the admissions system and from the at least one educational institution, at least one throttling criterion comprising at least one of: a geographic area, an applicant age, an applicant nationality, an applicant ethnicity, an applicant gender, an applicant religion, an applicant language proficiency, an applicant work experience, at least one applicant grade, an agency identity, an agency quality metric, and a mathematical value comparison, and a logical value comparison:

create, based on the at least one throttling criterion, a specified earliest start time for activating the rule window, and a specified latest stop time as the stop time for deactivating the rule window, a Student Entrance Application rule window algorithm for at least one educational institution, wherein the rule window algorithm determines a start time and a stop time for receiving an application, the rule window algorithm dynamically adjusting at least one of the start time and the stop time as a function of:

at least one admission factor, and a predictive element based on a rate of change of the at least one admission factor, the at least one admission factor comprising at least one of: an overall number of admission applicants, a number of spaces remaining in an educational program, a rate at which the at least one admission applicant is applying, an academic quality of the at least one admission applicant, and a change to the educational program, wherein the earliest start time for activating the rule window further comprises incorporating visa-processing time for the student from the geographic area of the agent;

receive, from the at least one agent and by the system, the at least one admission application during the rule window, wherein the when at least one criterion is met, processing the at least one admission application, and when the at least one criterion is not met, rejecting the at least one admission application, send, by the application system, an acceptance notice or rejection notice of the at least one admission application; and communicate, by the application system, with a payment module to execute prepayment of fees.

11. The system of claim 10, wherein the user interface is presented on one of a web browser and a mobile device.

12. The system of claim 10, wherein the admissions system comprises a web portal, an application server, and a database.

13. The system of claim 10, wherein the post-secondary institution system comprises a web portal and a database.

14. The system of claim 10, wherein the at least one service further comprises at least one of an email module, a notification module, a reporting module, and a payment module.

* * * * *